Figure 4:
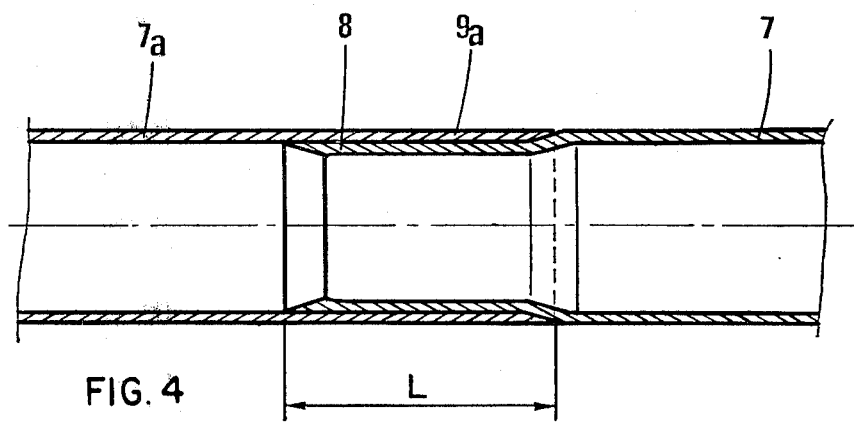

United States Patent [19]

Colas

[11] 4,326,773

[45] Apr. 27, 1982

[54] SOLAR ENERGY FOCUSING MEANS COMPRISING MODULAR ELEMENTS

[75] Inventor: François Colas, Bourg la Reine, France

[73] Assignee: Cegedur Societe de Transformation de l'Aluminium Pechiney, Paris, France

[21] Appl. No.: 137,364

[22] Filed: Apr. 4, 1980

[30] Foreign Application Priority Data

Apr. 11, 1979 [FR] France ............................. 79 09961

[51] Int. Cl.³ .................... G02B 5/10; G02B 7/18; B21D 39/04
[52] U.S. Cl. ................................ 350/292; 29/157 R; 29/525
[58] Field of Search ............... 350/292, 293, 296, 310, 350/320; 126/438; 29/157 R, 525

[56] References Cited

U.S. PATENT DOCUMENTS 3,866,285 2/1975 Clark .................................. 126/438

FOREIGN PATENT DOCUMENTS 2356463 1/1978 France .

Primary Examiner—Jon W. Henry
Attorney, Agent, or Firm—McDougall, Hersh & Scott

[57] ABSTRACT

The invention concerns a cylindro-parabolic reflector for focusing solar rays on the focal axis of the cylinder.

The reflector comprises modular elements which are assembled by means of tubes which are interengaged strictly in alignment with each other. The complementary male and female ends of the tubes have been formed by the tubes previously having been forcibly engaged into each other. This makes it possible to provide reflectors of substantially perfect parabolic shape, in spite of their substantial length.

The invention will be used primarily in the construction of solar steam generating stations.

3 Claims, 6 Drawing Figures

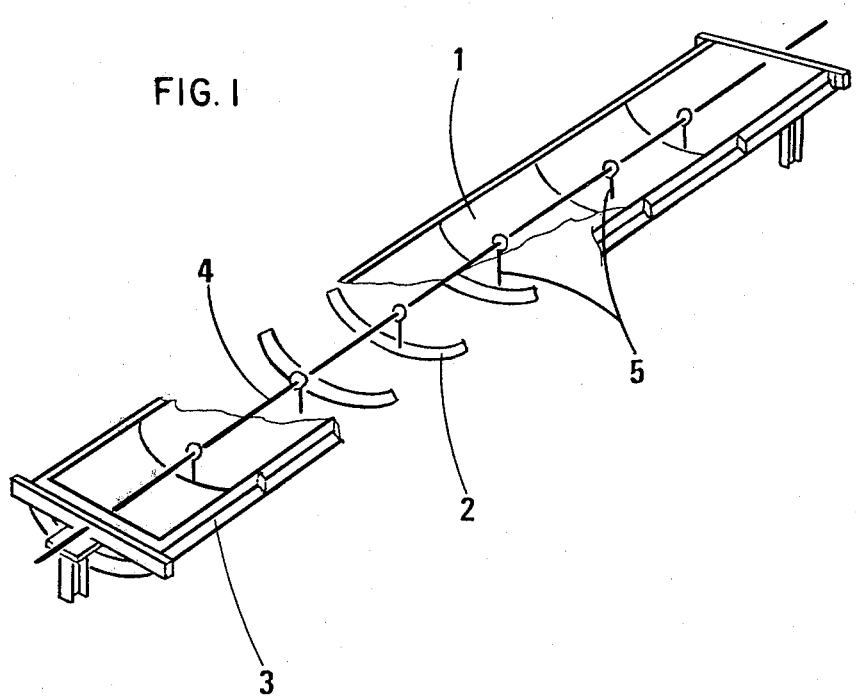

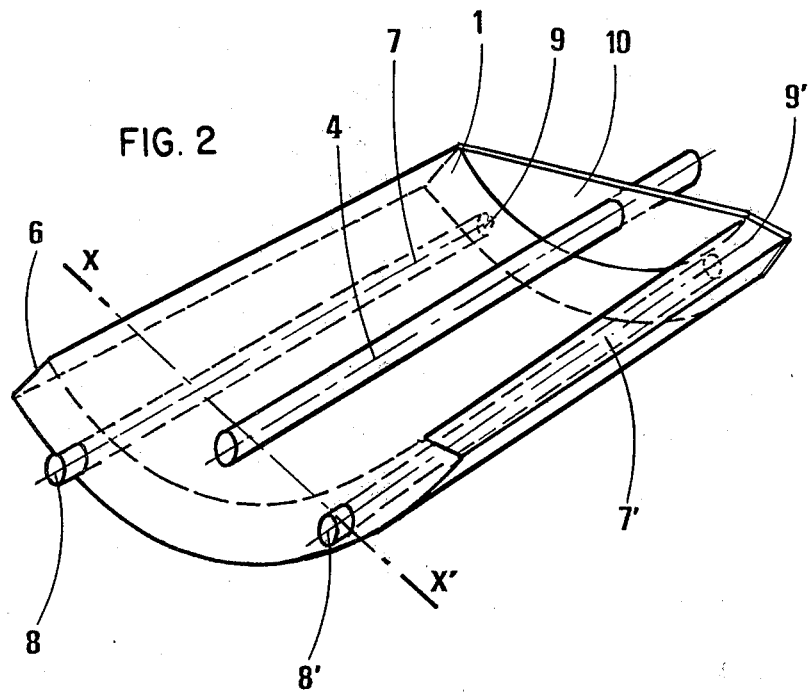
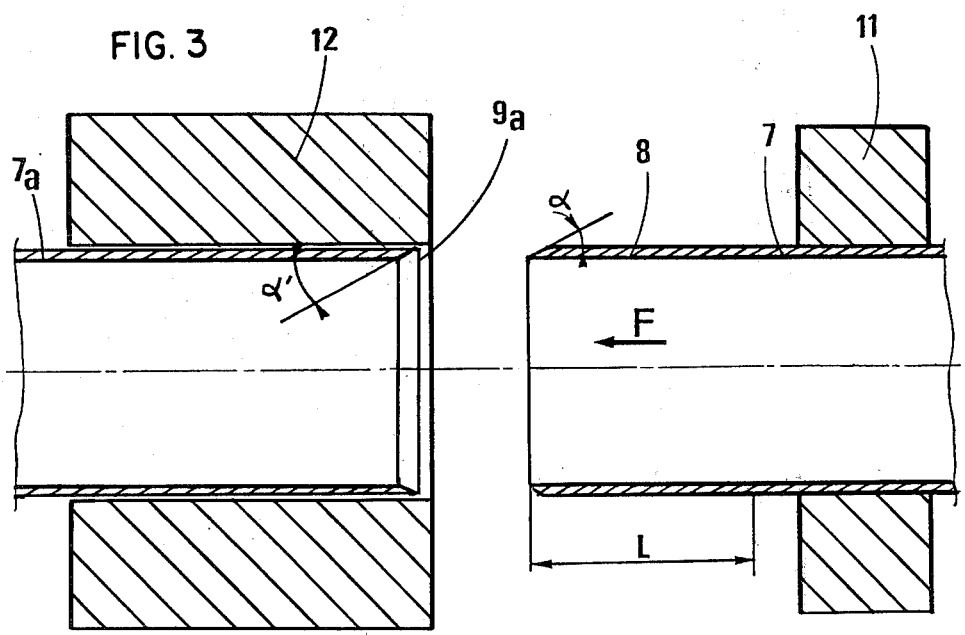

SOLAR ENERGY FOCUSING MEANS COMPRISING MODULAR ELEMENTS

The use of solar energy is becoming more widespread each day that passes, both for the production of heat and for the production of energy proper. When substantial temperatures are to be attained, for example in order to operate steam generating stations, it is necessary to concentrate the energy which is received over a substantial surface area, on to a very small area.

For that purpose, it is known to use energy focusing means in the form of cylindrical reflectors of parabolic sections, referred to as cylindro-parabolic, for concentrating or focusing the reflected rays on the focal axis of the cylinder, along which a pipe arrangement of small section is disposed, for collecting the energy received. These focusing means can oscillate about their focal axis in order to follow the path of the sun. Such reflectors are often very simply kinds of metal troughs of which the bottom is curved into a concave parabolic shape. However, if the reflecting surface, that is to say, the bottom of the trough, is formed by a simple curved or bent metal sheet, it is not possible for the bottom of the trough to be made into a highly accurate shape by bending or curving, by virtue of the irregularities and stresses which are caused by the rolling operation. Subsequently, even if the sheet metal used is more than a millimeter in thickness, it suffers from deformation under the effect of the mechanical forces and the effects of expansion and contraction in consequence of the variations in temperatures at night and in the day. In addition to the mechanical deformation phenomena, there are also the effects of flow under stress of the metal which in most cases is aluminium. It is necessary both to improve shaping the sheet metal into a strict configuration, and also to make it rigid. Thin reflecting elements in the form of a simple sheet metal trough member may obviously be provided on their back with angle flanges which permit connections to be made. However, these flanges give rise to local stresses and therefore deformation phenomena which are detrimental to a high level of efficiency. This also applies in regard to all the usual devices for connecting thin sheet-metal reflecting elements.

Moreover, if a high temperature is to be attained in the fluid circulating in the receiving pipe arrangement, it is necessary to provide elements of substantial length.

In order to attain substantial temperatures, it is necessary to concentrate, on a pipe means which is less than 16 mm in diameter, the heating rays received over a projected surface area which is at least 1 meter in width, and several meters in length.

It will be seen that, in order to produce a reflector which is 1 meter in width and several meters in length, and whose shape remains very close to the theoretical geometrical shape and whose surface has an excellent coefficient of reflection and a good level of resistance to the effects of weather, all this combined with a low cost price, there are technical problems which are difficult to solve.

In order to impart inertia and rigidity to the reflectors, it has been proposed that such reflectors may be made not in the form of a trough member of curved or bent sheet metal, which is relatively thick, but in the form of very thick panels filled with plastics foam, one of the faces of which is of the shape and has the qualities required to form a reflecting surface of the cylindro-parabolic type.

French Pat. No. 2,262,584 (U.S. Pat. No.3,866,285) to DOW CORNING describes a panel of such a design. In the above-quoted patent, the reflecting surface is in the form of several surfaces in the form of circular semi-cylinders which are coupled in a side-by-side arrangement, but it is easy to produce a similar panel whose reflecting surface is in the form of a single parabolic cylinder which occupies the entire width of the panel.

This production method has the advantage that it is possible to use a plastics foam which, in the course of production, develops a substantial pressure against the various faces of the panel. If the reflecting face of the panel is made of relatively thin sheet metal which, during the foaming process, is supported by a shaping mould, the reflecting face is applied against the mould over the entire area of the face and is shaped with a configuration which can be highly regular and accurate. The degree of perfection of the reflecting surface produced now virtually depends only on the care taken in producing the mould with the surface for moulding the reflecting face of the panel, in the form of a convex parabolic cylinder.

Composite panels of the DOW CORNING type, whether they have a reflecting surface in the form of a single parabolic cylinder or multiple cylinders in a side-by-side arrangement, are limited in length by virtue of the manufacturing and handling means available. If an elevated temperature of the order of 300° C. or more is to be obtained in the fluid circulating in the receiving pipe arrangement, a plurality of panels similar to that disclosed in the DOW CORNING patent must be connected in series. This gives rise to installation and connecting costs, to a loss in respect of ground surface area and calorific losses if a connecting tube systems is necessary.

It appears to be highly desirable for panels to be produced in a factory, in the form of modular elements of reduced dimensions, which can be assembled together at the position of use, to form an assembly of virtually indefinite length. After assembly of the reflector panel elements, a thin pipe arrangement of substantial length can be positioned along the focal axis of each cylindrical surface. Assembly of the modular elements must be carried out with a high degree of accuracy in order for the focus of each section to coincide with the thin pipe arrangement. With a reflector which is 1 meter in width and with a pipe which is 14 to 16 mm in diameter, the orientation of each point on the reflecting surface must be determined with a degree of accuracy of better than 20 minutes, over the entire length of the reflector. The assembly means itself must not apply any asymmetric force which could deform the panels. Thus, it is not possible merely to use an angle flange on the back of the panel to permit the panels to be assembled by bolts, even when using positioning dowels.

It has been found that the best solution with regard to assembling the panel elements in alignment with each other was for at least two tubes to be embedded substantially in the middle of the thickness of the panel, the tubes being disposed parallel to the generating lines of the reflecting surface and each being disposed in a strictly defined position with respect to said surface, whereby the homologous tubes are disposed strictly in alignment with each other. One end of each tube lies flush with the right-sectional plane or face of the cylindrical reflecting surface, the other end projecting beyond the opposite sectional plane or face by a properly defined length of the order of one to two diameters of the tube. This end is constricted so as to be a frictional fit in the opposite end of the homologous tube of the following panel element: a reduced-diameter end may be produced for example by welding a smaller-diameter end portion on to the tube or by boring out one end of the tube and machining the outside of the other. However, the thickness and the shape of the tubes areee not perfect, and it is always necessary to observe certain production tolerances which result in imperfect alignment of the reflecting surfaces when the elements are assembled together. It has been found that the best way of forming the tube ends of strictly complementary dimensions was for the end of each tube to be constricted in the corresponding end of the following tube by the method of forcible interengagement, as described in French Pat. No. 2,356,463. This method makes it possible to form strictly complementary ends, even if the tubes are ovalized or if they are not of constant thickness.

Thus, the desired number of tubes are cut to length, namely, the length of the panel plus a constant additional length of the order of one to two diameters of the tube. As described in French Pat. No. 2,356,463, the ends of each tube are shaped, one end being provided with an external chamfer to form a male bevelled end and the other being provided with a tapered bore to form a female end. The bored end is clamped in a non-deformable die arrangement and the chamferred end of another tube is forcibly engaged over the whole of the additional length. After interengagement of the two tubes, the tubes are disassembled by an axial pulling force so that they can be easily re-engaged after they have been set in position in their respective panels. This process which involves forcible interengagement and then disassembly results in strictly complementary tube ends, even if the tubes are originally somewhat ovalized or suffer from any defect. The tubes are marked so that they are subsequently disposed in alignment with each other in the successive panels.

This process makes it possible economically to produce panels comprising modular elements which can be assembled with a very high degree of accuracy.

The invention will be better appreciated from the following description of a particular embodiment and from the corresponding drawings.

Figure 5:
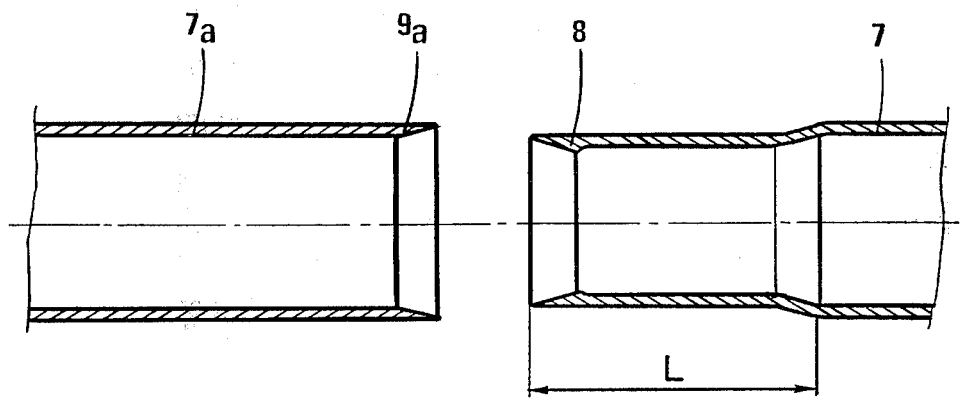
Figure 6:
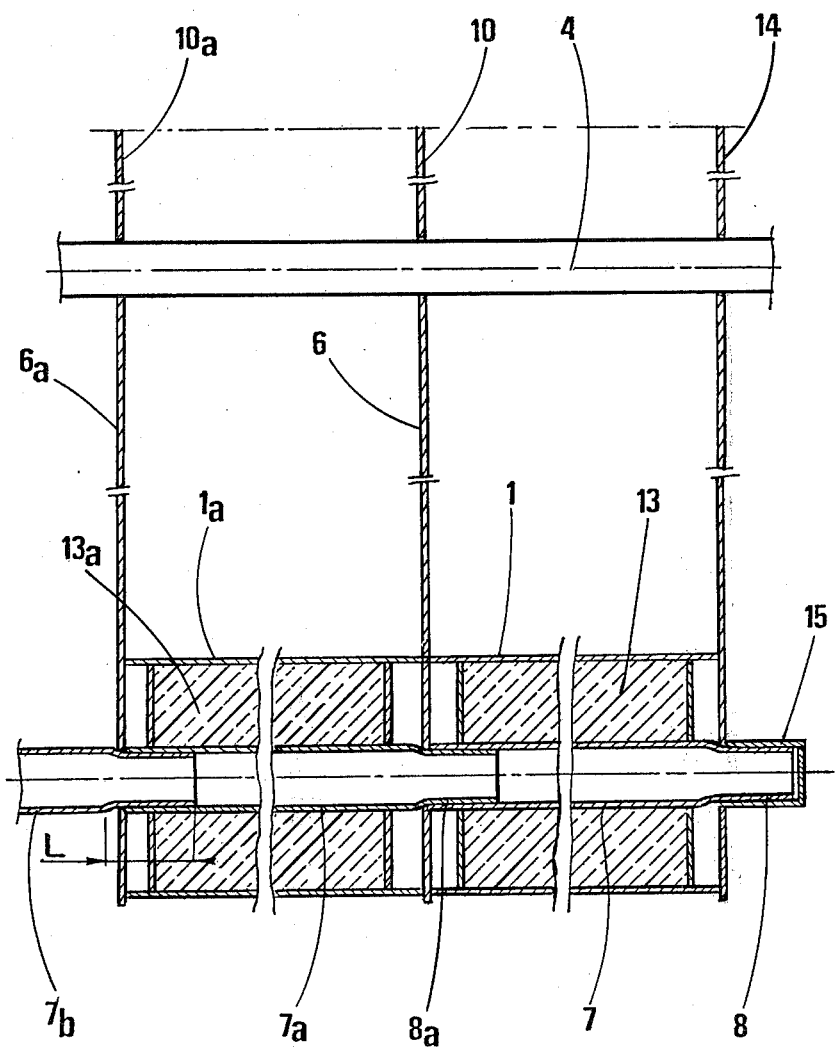

FIG. 1 shows a perspective view of a cylindro-parabolic reflector in the form of a trough member of aluminium plate, in accordance with the prior art, FIG. 2 is a diagrammatic perspective view of a modular reflector element with its interengageable tubes produced in accordance with the invention, FIG. 3 shows two of the complementary chamferred and bored tubes ready to be forcibly engaged for shaping the ends of the tubes, FIG. 4 shows the same two tubes after they have been engaged one into the other, FIG. 5 shows the two tubes after having been disassembled by an axial pulling force, and FIG. 6 shows a view in cross-section through the focal axis of a detail of the reflector on a larger scale.

Referring to FIG. 1, shown therein is a conventional reflector of sheet metal, made in one piece, in the form of a cylindro-parabolic trough member. It will be seen that the reflecting surface 1 could suffer deformation under the effect of mechanical or thermal stresses, in spite of the radial strengthening means 2 or peripheral strengthening means 3. The strengthening means themselves give rise to asymmetric stresses at the surface of the reflector and therefore produce defects. The pipe 4 on which the rays reflected by the surface 1 are focussed is held on the focal axis of the reflector by supports 5.

FIG. 2 shows a modular reflector element made in accordance with the invention, in the form of a panel 6. FIG. 2 shows a reflecting surface 1 of cylindro-parabolic shape, of shiny aluminium plate. The concave reflecting surface 1 is made of shiny aluminium plate which is 1 mm in thickness, while the five other faces of the box arrangement 6 are of stronger plate. FIG. 2 also shows two tubes 7 and 7' of aluminium, being 18/20 mm in diameter, which are embedded in a thickness of plastics foam. The ends 8 and 8' of the tubes 7 and 7' project beyond the face of the panel by 25 mm; they are constricted to an outside diameter of 18 mm over a length of 30 mm. It will be seen that the constricted ends 8 and 8' can be engaged without great difficulty into the non-constricted ends 8a and 8a' of homologous tubes of the following panel 6a. These interengagement fits are particularly accurate if the constricted end portions have been produced by the process described in French Pat. No. 2,356,463 to CEGEDUR, corresponding to FIGS. 3, 4 and 5.

There is shown a support plate member 10 which performs the supporting function of the supports 5 in the FIG. 1 construction and which makes it possible for a pipe 4 which is 14 mm in diameter to be fixed strictly along the focal axis of the reflecting surface 1.

FIGS. 3, 4 and 5 show, in the course of successive constriction operations, two homologous tubes 7a and 7b which are intended to be positioned in alignment with each other in two adjacent panel elements.

The end 8 to be constricted is firstly chamferred in a bevel configuration at an angle $\alpha$ of the order of 7° as shown in FIG. 3. The tube 7 is firmly held between the jaws 11 of a clamp at a distance from the end which is slightly greater than the length L over which the tube is to be constricted. In this case, L = 30 mm. The end 9a of the corresponding tube 7a which is to be disposed in the following panel 6a is provided with a taper bore at an anble $\alpha$ which is also 7°. The tube 7a is clamped over a length of 35 mm from its end, in a non-deformable die arrangement 12. By moving the jaws 11 towards the die arrangement 12 in the direction indicated by arrow F, the end 8 of the tube 7 is forced to undergo constriction and to penetrate into the homologous tube 7a over a length L. This therefore results in the arrangement shown in FIG. 4, as described in greater detail in French Pat. No. 2,356,463. The two tubes are then disassembled by an axial pulling force, resulting in two homologous tubes 7 and 7a whose male end 8 and female end 9a strictly correspond to each other, as shown in FIG. 5. These tubes therefore comprise complementary ends 8 and 9a which are shaped in accordance with strictly complementary forms, with zero and even slightly negative clearance. However, the accuracy with which the ends of the tubes are shaped makes it possible for them to be re-engaged into each other by means of a force which is much less than that required for the initial engagement between the tube ends.

The tubes are then set into a clearly defined position with a high degree of accuracy in an empty box structure corresponding to the shape of the modular element shown in FIG. 2, whose relatively flexible and malleable concave face 1 has been bent or curved into a shape close to the desired cylindro-parabolic shape. A relief mould of convex cylindro-parabolic shape, which is made of highly rigid material and which is machined with a high degree of accuracy is applied against the parabolic face. The mould may be for example of cast aluminium. A foaming plastics material 13 is injected and, by pressure, applies the face 1 strictly against the relief mould.

FIG. 6 shows a view in cross-section taken along line X—X' in FIG. 2 of two consecutive reflecting elements 6 and 6a. FIG. 6 shows a view in section of two reflecting surfaces 1 and 1a, two interengaged homologous tubes 7 and 7a and their constricted ends 8 and 8a. Two successive elements 6 and 6a are in butting relationship at the ends of their reflecting surfaces 1 and 1a, without leaving any clearance. For that purpose, the length of engagement of the constricted end 8a is only 25 mm whereas the constricted length L, produced in the manner described above, is 30 mm. Each reflector element as indicated at 6 and 6a comprises a thin metal sheet 10 perpendicular to the reflecting surface, which serves as a support both for the pipe 4 for collecting the received energy, and for the assembly tubes 7 and 7'. In this particular case, each member 10 and 10a is 1 mm in thickness. It has been treated on both its faces so as to have the same reflecting qualities as the cylindro-parabolic surface 1. The element, in this case the element 6, which is to form the end of the reflector, is closed by a sheet metal member 4 which is similar to the sheet metal members 10, to provide maximum reflection and recovery of the rays which impinge on the reflector obliquely. The internegagement tubes 7 can be closed at each end of the reflector, by a male or female plug means 15.

As described in the DOW CORNING patent, additional pipes can be easily embedded in the plastics material 13, to carry a fluid for coling the plastics material, while recovering therefrom the heat which is not reflected on to the receiving pipe 4. As described in the DOW CORNING patent, the reflecting sheet metal member 1 will advantageously be covered on each face with a thin film of protecting varnish or lacquer or plastics material. The varnish or lacquer will obviously be transparent on the concave surface. Each reflector element 6 is shown here as having two assembly tubes 7 and 7', but it will be appreciated that it is also possible to use three, four or five tubes, or more, depending on the dimensions of the elements.

I claim:

1. A solar energy focusing means comprising modular cylindro-parabolic reflector elements in the form of thick panels filled with plastics foam comprising means for assembly of one reflector element in alignment with adjacent reflector elements characterized in that said assembly means in each reflector element comprises at least two thin metal tubes (7 and 7') of the same diameter, which are disposed in the thickness of the plastics foam parallel to the generating lines of the cylinder, and end (8 and 8') of each tube projecting beyond the section plane of the reflecting surface and being constricted for receipt in telescoping relation within the unconstricted ends of the homologous tube of the adjacent element, each tube being disposed in a strictly defined position with respect to the reflecting surface (1) whereby the homologous tubes (7 and 7') of adjacent reflector elements are disposed strictly in endwise alignment with each other.

2. A focusing means according to claim 1 characterized in that the constructed end (8 and 8') of each tube is constricted by forcible engagement into the complementary end (9 or 9') of the homologous tubes of the adjacent element, and is then disassembled from the homologous tube by an axial pulling force, before being set in place in the thickness of the panel (6).

3. A focusing means according to claim 1 or claim 2 characterized in that each element comprises a thin shiny sheet metal member (10) which is perpendicular to the reflecting surface (1) and which can act as a support for a pipe means (4) in the focal axis of the reflecting surface (1).

* * * * *